United States Patent [19]

Horiguchi

[11] Patent Number: 5,321,679
[45] Date of Patent: Jun. 14, 1994

[54] APPARATUS FOR RECORDING AND/OR REPRODUCING INFORMATION ON AND/OR FROM RECORD MEDIUM BY USING PICK-UP AND METHOD OF RESETTING OPERATIONAL CONDITION OF THE SAME

[75] Inventor: Toshio Horiguchi, Hachioji, Japan

[73] Assignee: Olympus Optical Co., Ltd., Tokyo, Japan

[21] Appl. No.: 765,893

[22] Filed: Sep. 26, 1991

[51] Int. Cl.$^5$ ............................................. G11B 7/00
[52] U.S. Cl. .................................. 369/54; 369/44.29; 369/58; 369/116
[58] Field of Search ..................... 369/44.27–44.31, 369/53–55, 58, 116, 44.25–44.26, 44.34–44.36, 44.39; 235/454, 456

[56] References Cited

U.S. PATENT DOCUMENTS 4,942,564 7/1990 Hofer et al. ......................... 369/58

FOREIGN PATENT DOCUMENTS 3-120621 5/1991 Japan .

Primary Examiner—W. R. Young
Attorney, Agent, or Firm—Stevens, Davis, Miller & Mosher

[57] ABSTRACT

An apparatus for recording and reproducing information on and from an optical record medium including a pick-up unit and a main unit to which the pick-up unit is detachably secured. In order to obtain the optimum operational conditions even when the pick-up unit is exchanged, an electrically erasable and programmable read only memory is provided in the pick-up unit and characteristic data for defining the operational conditions such as a threshold level for converting the read out signal into a bivalent signal and a laser output power is stored in the memory. The characteristic data is read out of the memory and the operational conditions of the apparatus are controlled in accordance with the read out characteristic data. When a new optical record medium having a different optical property than the currently used optical record medium is introduced, the characteristic data stored in the memory is rewritten without detaching the pick-up unit such that the operational conditions of the apparatus are reset in conformity with the new optical record medium.

8 Claims, 9 Drawing Sheets

FIG.6A

|   | 7 | 6 | 5 | 4 | 3 | 2 | 1 | 0 |
|---|---|---|---|---|---|---|---|---|
| 0 | F9H ||||||||
| 1 | Reserved ||||||||
| 2 | Reserved ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | 0 | 0 | 0 | 0 | 0 | 0 | 0 | 0 |

FIG.6B

|   | 7 | 6 | 5 | 4 | 3 | 2 | 1 | 0 |
|---|---|---|---|---|---|---|---|---|
| 0 | FAH ||||||||
| 1 | Reserved ||||||||
| 2 | Reserved ||||||||
| 3 | Reserved ||||||||
| 4 | Reserved ||||||||
| 5 | Reserved ||||||||
| 6 | Reserved ||||||||
| 7 | Reserved ||||||||
| 8 | Reserved ||||||||
| 9 | 0 | 0 | 0 | 0 | 0 | 0 | 0 | 0 |

FIG. 7

| Address | Contents |
|---|---|
| 00$^H$ | Check Sum Data |
| 01$^H$ | Focus Servo Gain |
| 02$^H$ | Track Servo Gain |
| 03$^H$ | Writing Laser Power |
| 04$^H$ | Threshold Level |
| 05$^H$ | Writing Pulse Width |
| 06$^H$ ⋮ 5B$^H$ | Reserved |
| 5C$^H$ | Serial No. of Pick-up (L) |
| 5D$^H$ | Serial No. of Pick-up (H) |
| 5E$^H$ | Version of Apparatus |
| 5F$^H$ | Manufacture Code |

APPARATUS FOR RECORDING AND/OR REPRODUCING INFORMATION ON AND/OR FROM RECORD MEDIUM BY USING PICK-UP AND METHOD OF RESETTING OPERATIONAL CONDITION OF THE SAME

BACKGROUND OF THE INVENTION

Field of the Invention and Related Art Statement

This invention generally relates to a technique for setting operational conditions of an apparatus for recording and/or reproducing information on and/or from a record medium by using a pick-up, and more particularly relates to an information recording and/or reproducing apparatus having a faculty for automatically setting operational conditions in an easy and prompt manner.

There have been proposed various kinds of apparatuses of the kind mentioned above. For instance, information writing and reading apparatuses using magnetic disk, optical disk, optical card and magnetooptical magnetic disk as the record medium have been proposed. Such an apparatus is generally composed of a main unit and a pick-up unit In general, the pick-up unit is manufactured separately from the main unit and a pick-up unit and a main unit are assembled to construct an information recording and/or reproducing apparatus. When the pick-up unit in the apparatus becomes out of order, the pick-up unit is detached from the main unit and is replaced by a new one. Since respective pick-up units are not formed completely identical with each other and there are always differences between particular pick-up units mainly due to a possible tolerance in manufacture. In order to compensate these differences, there is provided mechanical and/or electrical adjusting means in the main unit. For example, in a signal processing circuit of the main unit, there is provided a variable resistor which is adjusted when the pick-up unit is replaced by a new one such that the operational conditions of the signal processing circuit are adopted to operational characteristics of the new pick-up unit.

However, since the variable resistor is provided in the main unit, every time the pick-up unit is replaced, it is necessary to access the variable resistor and adjust it in accordance with the operational characteristics of the pick-up unit. This is apparently cumbersome and requires a time consuming labor work of an expert.

In order to avoid such a drawback, in copending U.S. Patent application Ser. No. 07/657,507 filed on Feb. 19, 1991 there is proposed to provide a memory in a pick-up unit and to store characteristic data for setting the various operational conditions specific to the relevant pick-up unit. When such a pick-up unit is assembled with a main unit, the characteristic data is read out of the memory and the operational conditions of the main unit are automatically adjusted in accordance with the read out characteristic data. Therefore, when the pick-up unit is replaced by a new one, it is no more necessary to adjust manually the adjusting means such as the variable resistor provided in the main unit.

For instance, in a system using the optical cards as the record medium, it is sometimes required to change the optical cards and to introduce new optical cards. Usually the new optical cards have different light reflectance and recording sensitivity than the currently used optical cards. Therefore, when the optical cards are changed, it is necessary to change various operational conditions such as a threshold level for converting a signal read out of the optical card into a bivalent signal, a reading laser output power for reading information out of the optical card, a writing laser output power for writing information on the optical card, and a writing pulse width. In such a case, even if the pick-up unit having the memory installed therein is used, the correct operation could not be attained unless the characteristic data stored in the memory is rewritten in accordance with the characteristics of the new optical cards. However, the contents in the memory could not be rewritten in an easy and prompt manner, because it is necessary to remove the pick-up unit from the main unit in order to access the memory.

SUMMARY OF THE INVENTION

The present invention has for its object to provide a novel and useful apparatus for recording and/or reproducing information on and/from a record medium including a main unit and a pick-up unit which is detachably secured to the main unit, in which operational conditions of the apparatus can be adjusted in an easy and prompt manner without removing the pick-up unit from the main unit.

According to a first aspect of the invention, an apparatus for recording and/or reproducing information on and/or from a record medium comprises:

a pick-up unit including a pick-up and a memory means for storing characteristic data which is specific to the relevant pick-up; and a main unit including a data reading means for reading the characteristic data out of said memory means to derive a characteristic data signal, a signal processing means for processing said characteristic data signal to derive at least one control signal, an adjusting means for adjusting at least one operational condition of the apparatus in accordance with said control signal such that the apparatus can operate in conformity with the characteristics of the relevant pick-up, and a data rewriting means for selectively rewriting the characteristic data stored in said memory means.

In the information recording and/or reproducing apparatus according to the invention, the characteristic data can be rewritten simply without detaching the pick-up unit from the main unit, when it is required to change at least a part of the operational conditions of the apparatus.

According to a second aspect of the invention, a method of resetting operational conditions of an information recording and/or reproducing apparatus including a main unit and a pick-up unit which is detachably secured to the main unit, comprises the steps of:

storing characteristic data specific to the relevant pick-up unit in a memory means provided in the pick-up unit;

reading the characteristic data out of said memory means;

processing the read out characteristic data to derive at least one control signal;

controlling at least one operational condition of said information recording and/or reproducing apparatus in accordance with said at least one control signal such that said apparatus can operate in conformity with the relevant pick-up unit;

checking whether operational conditions controlled by said characteristic data stored in the memory means is suitable for a record medium or not;

deriving new charactertistic data when the characteristic data is not suitable for recording and/or reproducing the information on and/or from the relevant record medium; and rewriting at least partially the characteristic data stored in said memory means by said new characteristic data.

According to the invention, when it is required to rewrite the characteristic data stored in the memory means while the apparatus has been used in the data processing system including a host computer, a program for rewriting the characteristic data stored in the memory means is supplied into the host computer by using a floppy disk in which said program is stored. Then, the program is executed by the host computer. Also in this case, it is not necessary to remove the pick-up unit from the main unit, so that the characteristic data rewriting operation can be performed easily on the user's side.

BRIEF DESCRIPTION OF THE DRAWINGS

FIGS. 6A and 6B are schematic views representing examples of the reading command and writing command;

FIG. 7 is a schematic view representing an example of the characteristic data stored in the memory provided in the pick-up unit;

DETAILED EXPLANATION OF THE PREFERRED EMBODIMENTS

Figure 1:
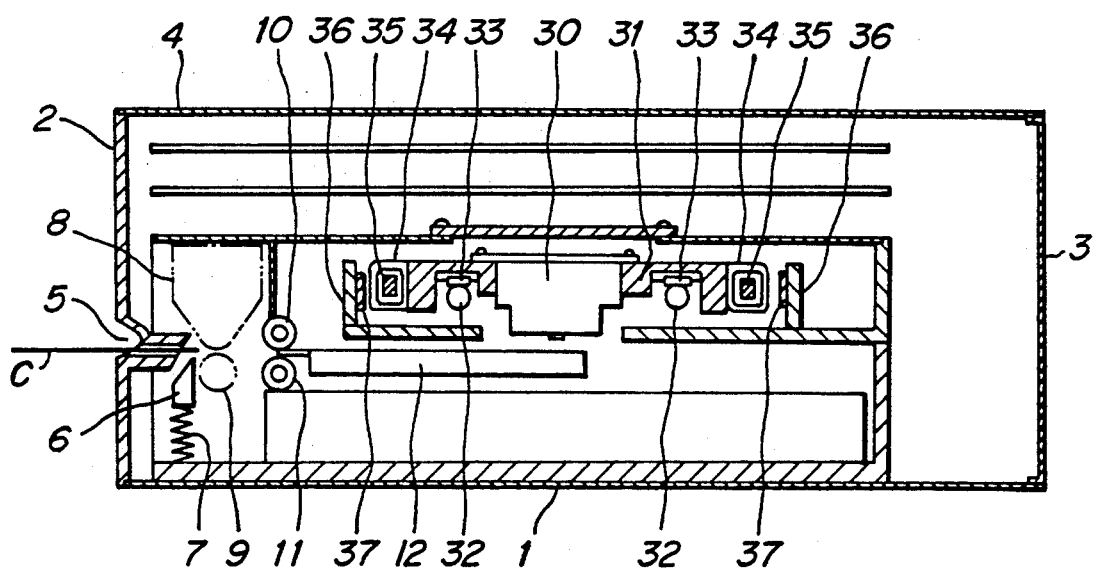
FIG. 1 is a partially cross sectional view showing an embodiment of the information recording and reproducing apparatus according to the invention.
Figure 2:
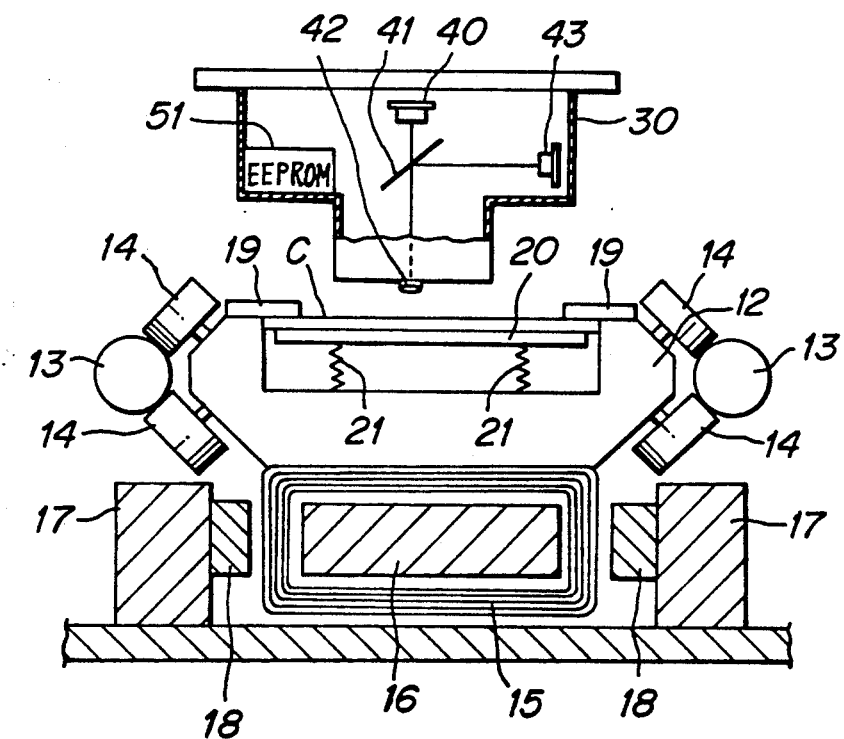
FIG. 2 is a cross sectional view illustrating a voice coil motor for moving the pick-up in the direction parallel with the longitudinal direction of the optical card.

FIG. 1 is a partially cross sectional view showing an embodiment of the information recording and reproducing apparatus according to the invention, and FIG. 2 is a cross sectional view depicting the construction of a voice coil motor for moving a record medium relative to a pick-up unit. In the present embodiment, the record medium is formed by an optical card and the pick-up unit is constructed by an optical pick-up unit as will be explained hereinlater. A housing of the apparatus includes a base 1, front panel 2, rear panel 3 and outer cover 4. In the front panel 2 there is formed an opening 5 through which an optical card C can be inserted into the apparatus. The opening 5 can be closed by a shutter 6 which is biased upwardly by means of a coiled spring 7. When the optical card C is inserted into the opening 5 formed in the front panel 2, the shutter 6 is moved downward against the force of the coiled spring 7 by energizing a solenoid not shown. The optical card C inserted into the housing is transported between a cleaning device 8 and a roller 9, so that dusts and debris applied on a front surface of the optical card are removed. After that, the optical card C is fed between feeding rollers 10 and 11, and is transferred onto a shuttle 12 by rotating the roller 11 in a given direction. It should be noted that when the roller 11 is rotated in an opposite direction, the optical card C can be removed from the shuttle 12.

As shown in FIG. 2, the shuttle 12 for supporting the optical card C is slidably supported on a pair of guide shafts 13 by means of guide rollers 14. On a bottom surface of the shuttle 12 is secured a voice coil 15 into which a yoke 16 is inserted. In opposition to the voice coil 15, there are arranged yokes 17 and permanent magnets 18 are secured to the yokes 17. Therefore, by conducting a current through the voice coil 15 in one direction, the shuttle 12 is moved in one direction along the guide shafts 13. The moving direction of the shuttle 15 may be reversed by changing the direction of the current passing through the voice coil 15. The optical card C transported onto the shuttle 15 is clamped between stationary plates 19 and a pushing plate 20 which is biased upwardly by means of coiled springs 21.

Above the shuttle 12 there is arranged an optical pick-up unit 30. The optical pick-up unit 30 is inserted into an opening formed in a carriage 31 and a flange of the optical pick-up is secured to the carriage by means of screws. Therefore, the pick-up unit can be easily detached from the carriage 31. The carriage 31 is supported movably in a direction perpendicular to the longitudinal direction of the optical card C by means of guide shafts 32 and guide rollers 33. In order to move reciprocally the carriage 31 in said direction, there is also provided a voice coil motor including voice coils 34, yokes 35 and 36 and permanent magnets 37. By conducting currents though the voice coils 34 in given directions, the carriage 31 and thus the optical pick-up unit 30 are moved in one direction along the guide shafts 32. By reversing the directions of the currents, it is possible to move the carriage 31 in the opposite direction.

In the manner explained above, the optical pick-up unit 30 can be moved relative to the optical card C in the direction perpendicular to the longitudinal direction of the optical card and at the same time the optical card can be moved relative to the optical pick-up unit 30 in the direction parallel with the longitudinal direction of the optical card by moving the shuttle 12 by means of the voice coil motor.

As shown in FIG. 2, the optical pick-up unit 30 comprises a laser diode 40 emitting a laser beam, a half mirror 41, an objective lens 42 for projecting the laser beam onto the optical card C and a photodetector for receiving light reflected by the optical card. When the information record on the optical card C is read out, the output power of the laser diode 40 is set to a lower value, while in case of recording information on the optical card, the output power of the laser diode is set to a higher value. In practice, in the optical pick-up unit 30, there are provided a focusing mechanism for moving the objective lens 42 in a focusing direction parallel with its optical axis and a tracking mechanism for driving the objective lens in a tracking direction perpendicular to the focusing direction. Usually these focusing and tracking mechanisms are formed by electromagnetic driving means. However, in FIG. 2 these focusing and tracking mechanisms are not shown for the sake of simplicity.

Figure 3:
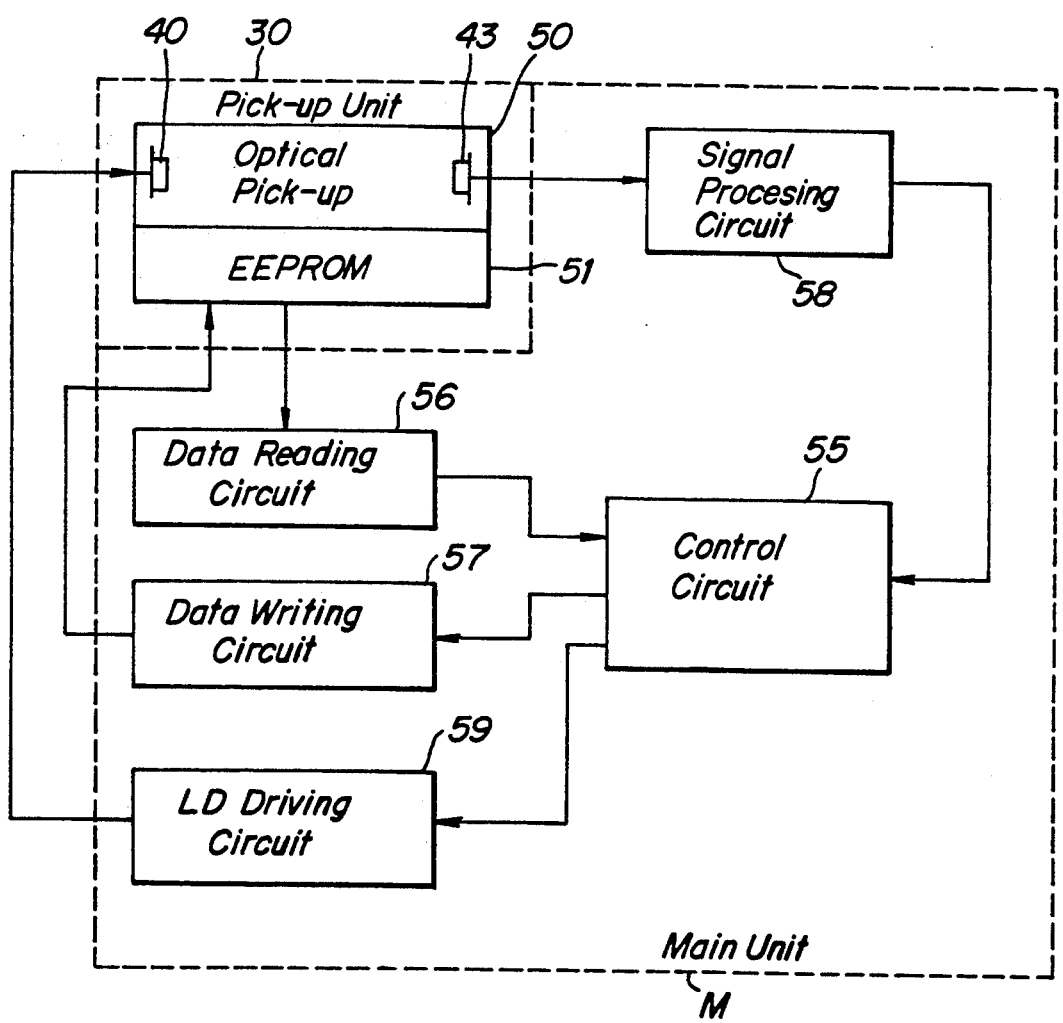
FIG. 3 is a block diagram depicting the construction of the information recording and reproducing apparatus shown in FIGS. 1 and 2.

FIG. 3 is a block diagram showing the construction of the optical card recording and reproducing apparatus shown in FIGS. 1 and 2. The optical card recording and reproducing apparatus can be roughly divided into the pick-up unit 30 and a main unit M. The pick-up unit 30 includes an optical pick-up 50 and a memory 51 for storing characteristic data which is specific to the relevant pick-up 30. In the present embodiment, the memory 51 is formed by EEPROM (electrically erasable and programmable read only memory). The main unit M comprises a control circuit 55, a data reading circuit 56 for reading the characteristic data out of the memory 51 under the control of the control circuit 55, a data writing circuit 57 for writing the characteristic data into the memory 51 under the control circuit 55, and a read out signal processing circuit 58 which processes a signal read out of the optical card C and supplied from the photodetector 43 provided in the optical pick-up 50. The signal processed by the read-out signal processing circuit 58 is supplied to the control circuit 55. The main unit M further comprises a laser diode driving circuit 59 for generating a current conducting through the laser diode 40 provided in the optical pick-up 50. It should be noted that the amplitude of the current passing through the laser diode 40 determines the brightness of the laser beam emitted by the laser diode.

As explained above, it is sometimes required to replace the currently used optical cards by new optical cards or to introduce new optical cards in the optical card system. In such a case, the characteristic data stored in the memory 51 of the pick-up unit 30 becomes unsuitable for performing the correct recording reproducing, because the light reflectance and recording sensitivity of the new optical cards are usually different from those of the currently used optical cards. In the present embodiment, in order to carry out the recording properly, the characteristic data stored in the memory 51 of the pick-up unit 30 relating to the writing laser power is rewritten in an automatic manner without removing the pick-up unit 30 from the apparatus.

Figure 4:
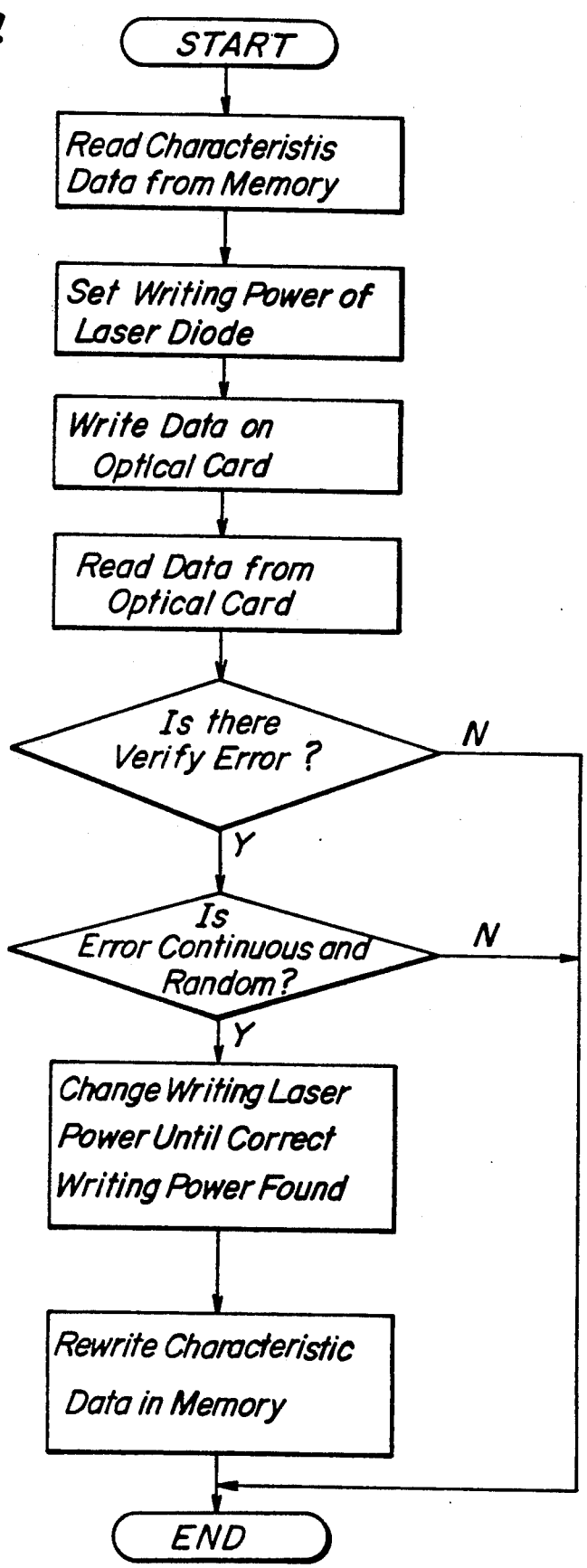
FIG. 4 is a flow chart showing successive steps for rewriting the characteristic data stored in the memory.

FIG. 4 is a flow chart representing successive steps for rewriting the characteristic data in the memory 51. At first, the characteristic data stored in the memory 51 is read out by means of the data reading circuit 56 and the read-out characteristic data is supplied to the control circuit 55. Then, the control circuit 55 determines an amplitude of the laser driving current in accordance with the read-out characteristic data. Next, a predetermined data is recorded on the optical card C. In this case, the control circuit 55 sends a command to the laser driving circuit 59 so that it supplies the driving current having the above determined amplitude to the laser diode 40 in the pick-up 50. After that, the data recorded on the optical card C is read out and the read-out signal generated by the photodetector 43 is supplied to the control circuit 55 after being processed by the read-out signal processing circuit 58. In the control circuit 55, the read-out signal is verified to check whether the data has been recorded on the optical card C correctly or not. When it is confirmed that the data has been recorded correctly, it is no more necessary to change the writing laser power. But, when it is found that the data could not be recorded correctly, the writing laser power has to be changed It should be noted that both the errors due to the unsuitable writing laser power and dusts or injury on the optical card occur continuously, so that they could not be delineated from each other. In the present embodiment, in order to find the error due to the unsuitable writing laser power, it is further checked whether the error occurs at random or regularly. When the writing laser power is not suitable, there is produced a verify error in a random manner. Contrary to this, when an error is produced by defects on the optical card C such as dusts and injury, the error appears at a specific position on the optical card. To this end, the data read out of the optical card C is once stored in a RAM in the control circuit 55 and the error correction is performed to find a position of the error. When it is checked that the error does not occur at random positions, it can be confirmed that the writing laser power is not suitable. When it is confirmed that the writing laser power is not suitable, the writing laser power is changed higher than a current value and the above mentioned operation is performed Next the writing laser power is made lower than the current value and the above explained operation is repeated. In this manner, the direction in which the writing laser power has to be changed can be detected. Then, the writing laser power is gradually changed in the thus detected direction, i.e. increased or decreased in a stepwise manner During this operation, the optimum writing laser power can be detected. Then, new characteristic data is derived such that the optimum writing laser power can be obtained. Finally, the characteristic data stored in the memory 51 relating to the writing laser power is rewritten by the new characteristic data by means of the data writing circuit 57 such that when the laser diode driving circuit 59 is controlled in accordance with the characteristic data read out of the memory 51, the writing laser power is automatically adjusted to the optimum value.

In the present embodiment, since the control circuit 55 in the information recording and reproducing apparatus is constructed such that the characteristic data stored in the memory 51 provided in the pick-up unit 50 is rewritten. Therefore, when the new optical cards are introduced in the optical card system, the characteristic data specific to the relevant pick-up 50 can be rewritten in an easy and prompt manner without removing the pick-up unit 30 from the main unit M.

Figure 5:
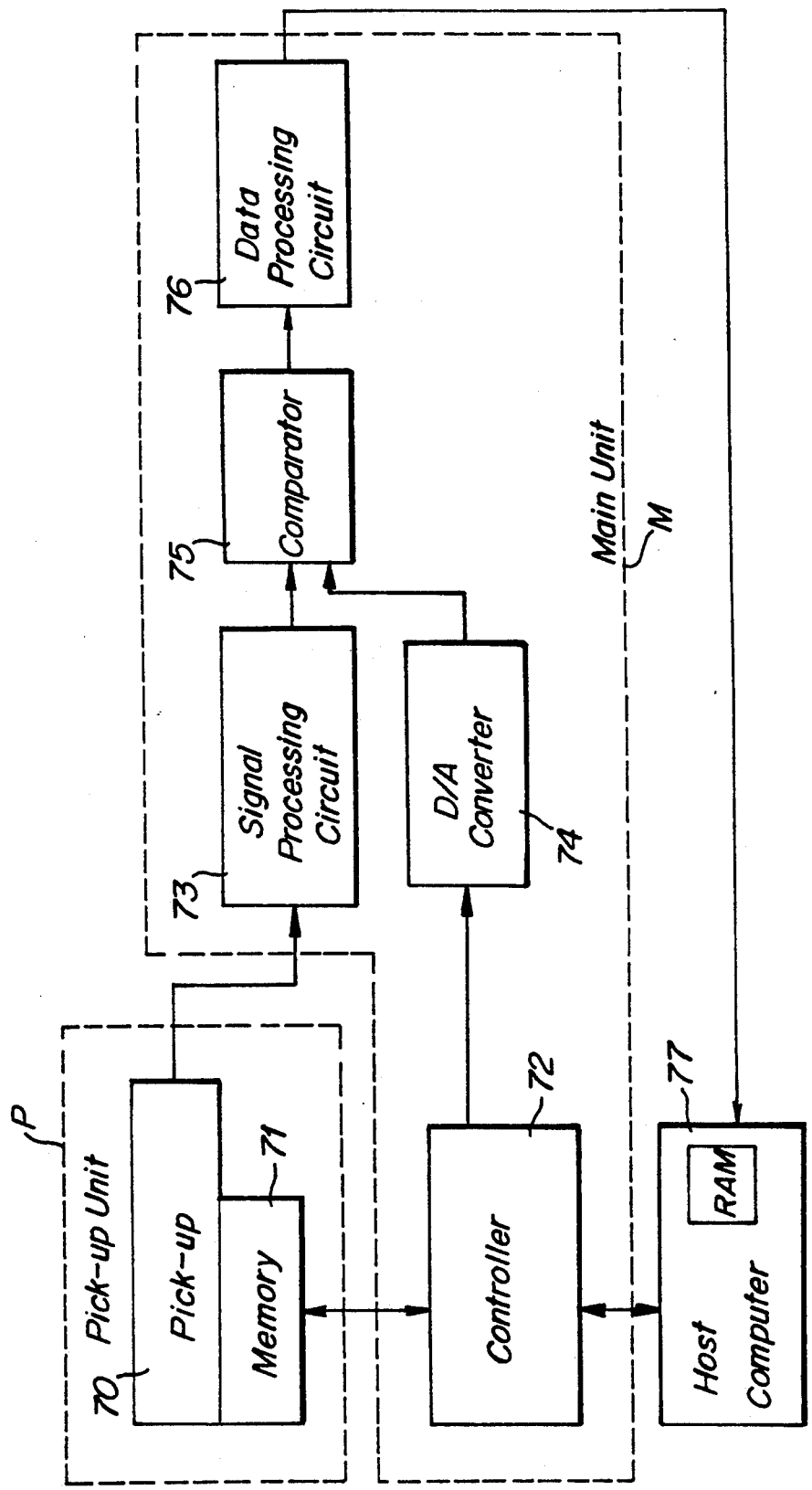
FIG. 5 is a block diagram showing the construction of an apparatus for carrying out a first embodiment of the operational condition setting method according to the invention.

FIG. 5 is a schematic view illustrating a whole system for resetting the operational conditions of the information recording and reproducing apparatus by using a host computer connected to the apparatus. The information recording and reproducing apparatus comprises a pick-up unit P including an optical pick-up 70 and a memory 71, and a main unit M having a controller 72 for controlling the operation of the optical card recording and reproducing apparatus, a read-out signal processing circuit 73 for processing a signal generated by the photodetector of the pick-up 70, a D/A converter 74 for setting a threshold level which is used to convert the read out signal into a bivalent signal, a comparator 75 for converting the read out signal into the bivalent signal in accordance with the threshold level which is controlled by the output of the D/A converter 53, and a data processing circuit 75 for processing the bivalent signal supplied from the comparator 75. In the present embodiment, a host computer 77 is connectable to the controller 72 in the information recording and reproducing apparatus via a communication line, so that the operation of the whole apparatus can be controlled by the host computer 77.

It should be noted that it is not necessary to access the memory 71 at a high speed and D/A converter 74 operates at a high speed, so that the signal is preferably transmitted between the controller 72 and these elements in the serial data transmission mode. Then, the number of signal lines can be reduced. Also in order to reduce the number of signal lines connected to the controller 72, the controller is preferably formed by one chip microcomputer.

In the present embodiment, a read out signal generated by a photodetector of the pick-up 70 is processed by the signal processing circuit 73 and then is converted by the comparator 75 into a bivalent signal. In the comparator 75, the read out signal is compared with a threshold level, and when the read out signal is equal to or higher than the threshold level, it is converted into a bivalent high signal and when the read out signal is lower than the threshold level, it is converted into a bivalent low signal According to the present embodiment, the threshold level is set by an analog output signal of the D/A converter 74.

The read out by the controller 72 under the control of the host computer 77. The controller 72 then derives a digital signal which defines the threshold level in accordance with the read out characteristic data. This digital signal is supplied to the D/A converter 74 and is converted thereby into a analog threshold signal. According to the invention, the characteristic data stored in the memory 71 can be rewritten by the host computer 77 via the controller 72.

FIG. 6A shows an example of a command for reading the characteristic data out of the memory 71, and FIG. 6B illustrates a command for writing changed characteristic data from the host computer 77 into the memory 71. These commands are resembled to SCSI which defines a standard interface between a personal computer and an external memory apparatus and can be set by a manufacture of the apparatus. That is to say, these commands are vendor unique.

FIG. 7 shows an example of the characteristic data stored in the memory 71 provided in the pick-up unit P. In this case the memory 71 has a capacity of 96 bytes. Therefore, the commands shown in FIGS. 6A and 6B are formed such that all of 96 bytes of the memory can be accessed In FIG. 7, address 00H denotes a check sum data which is used to check an error in all the data.

Figure 8:
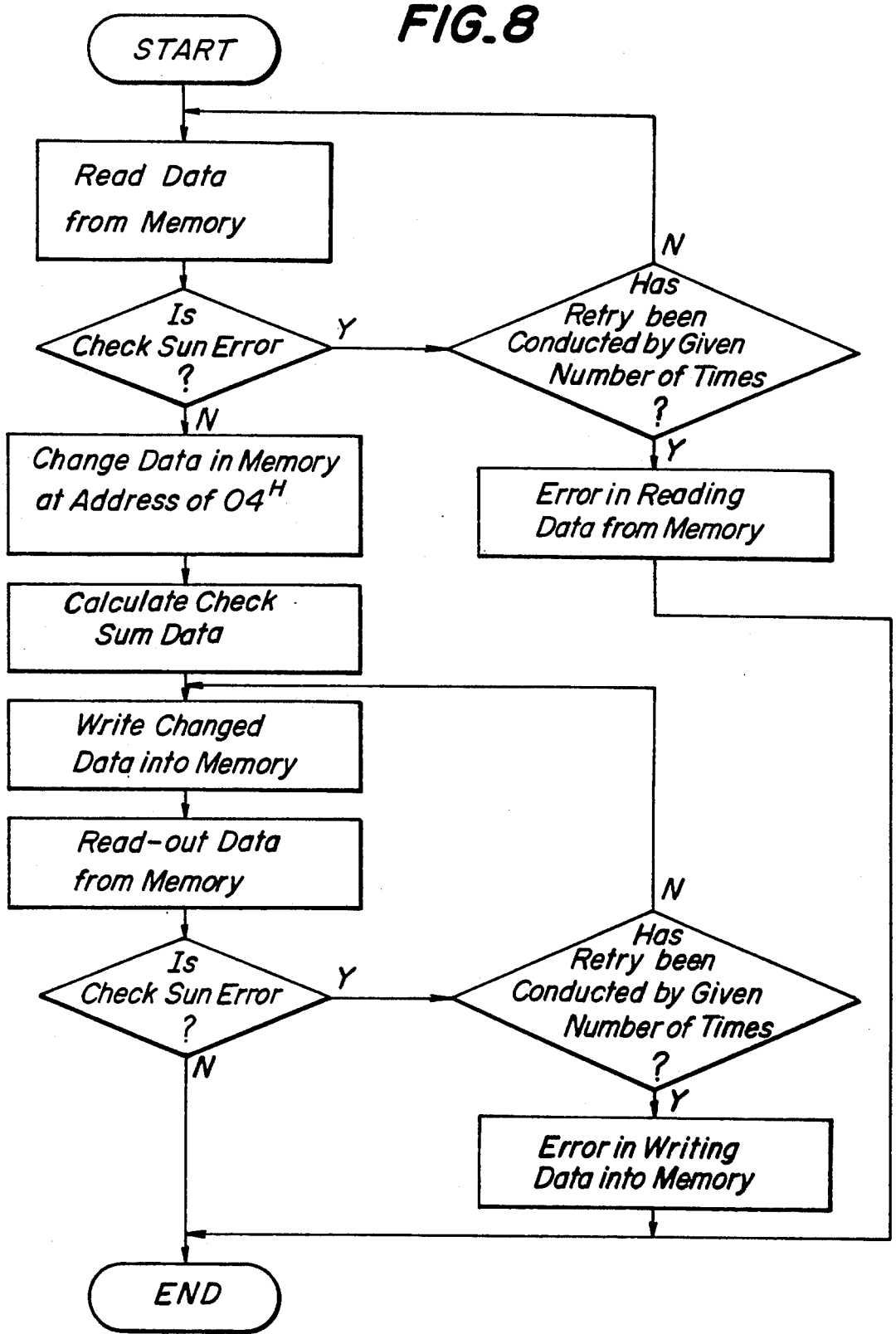
FIG. 8 is a flow chart showing successive steps for rewriting the characteristic data stored in the memory.

FIG. 8 is a flow chart for explaining the operation in the host computer 77 in case of rewriting threshold level setting data stored in the memory 71 at address 04 H among the characteristic data stored in the memory. At first, all the characteristic data stored in the memory 71 is read out by using the read-out command shown in FIG. 6A. The thus read out data is stored in a random access memory RAM provided in the host computer 77. In this case, the data reading operation is checked by using the check sum data stored in the memory at address 00H and it is confirmed whether the data has been read out correctly or not. When it is found that the data has not been read out correctly, the re-try operation is repeated by a predetermined number of times. After the re-try has been effected by said number of times, when the data could not read out correctly, it is judged that the memory 71 is in error and an error routine is performed. Since the error routine is not essential for the present invention, it is not explained here any more.

When it is confirmed that the characteristic data has been correctly read out of the memory 71, the threshold level setting data among the characteristic data stored in the RAM of the host computer 77 at address 04H is rewritten by new data. This new data may be derived by processing the read out data supplied from the data processing circuit 56 such that the threshold level can be adjusted to a suitable value by means of which the data read out of the optical card C by using the relevant pick-up 70 can be correctly converted into the bivalent signal. After that, a check sum for all the data of 96 bytes is calculated and the thus calculated check sum is written in the RAM at address 00H.

Next, all the data stored in the RAM of the host computer 77 is supplied to the controller 72 in the main unit M of the apparatus and then is written into the memory 71 provided in the pick-up unit P under the control of the command illustrated in FIG. 6B. Then, the content of the memory 71 is read out again by using the reading command illustrated in FIG. 6A and the thus read out data is compared with the characteristic data stored in the RAM in the host computer 77. It should be noted that the check sum data read out of the memory 71 is not compared with the check sum data in the characteristic data stored in the RAM, but is compared with a check sum data which is calculated from the newly read out data. After the new data has been stored in the memory 71 under the control of the writing command supplied from the host computer 77, the controller 72 reads the characteristic data out of the memory 71, and derives a new threshold level signal. This new threshold level signal is supplied to the D/A converter 74 and is converted thereby into a new analog threshold level setting signal which is supplied to the comparator 75. In this manner, the new threshold level is set in the comparator 75 and the read out signal can be correctly converted into the bivalent signal on the basis of the new threshold level.

In the present embodiment, the characteristic data stored in the memory 71 provided in the pick-up unit P can be rewritten by the command from the host computer 77, and therefore the characteristic data specific to the relevant pick-up 70 can be changed in a very simple and prompt manner.

Figure 9:
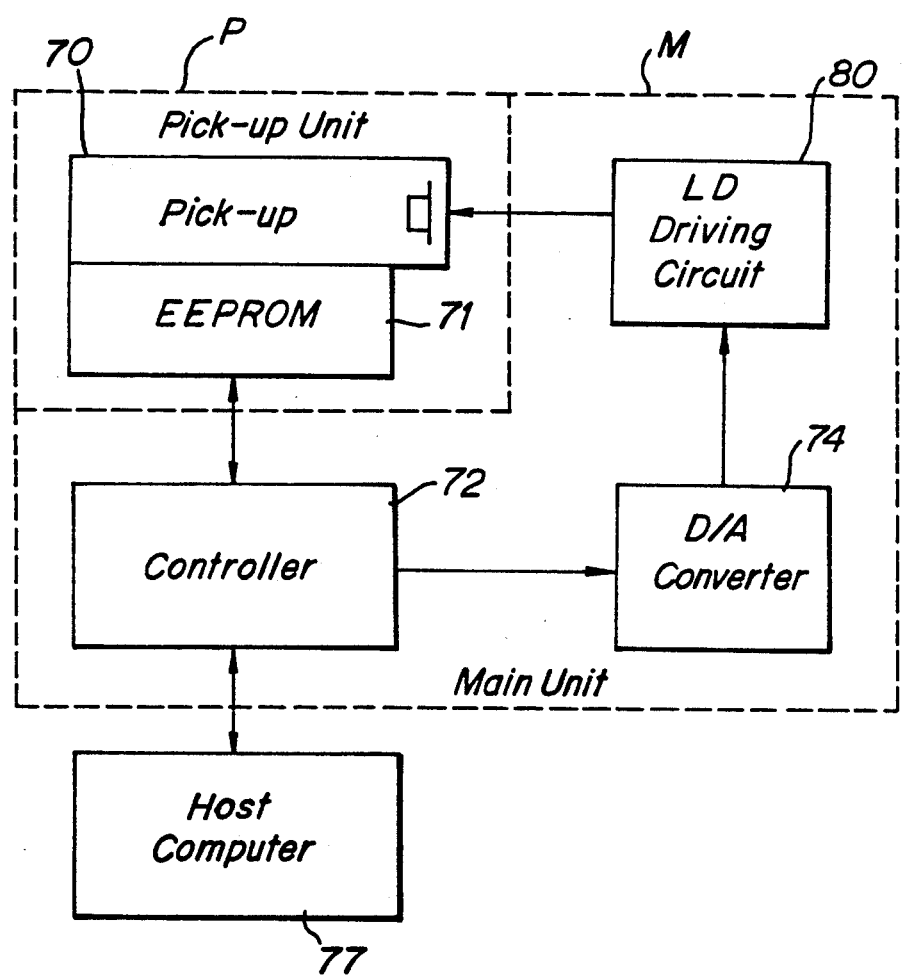
FIG. 9 is a block diagram illustrating the construction of the apparatus for performing an second embodiment of the operational condition setting method according to the invention.

FIG. 9 is a block diagram showing a second embodiment of the system for setting the operational conditions of the information recording and reproducing apparatus according to the invention. In the present embodiment, portions similar to those of the embodiment shown in FIG. 5 are denoted by the same reference numerals used in FIG. 5. In the present embodiment, the output power of a writing laser beam emitted by a laser diode LD provided in an optical pick-up 70 can be automatically adjusted by the command from a host computer 77. An output of the D/A converter 74 is set via the controller 72 in accordance with the characteristic data stored in the memory 71. The output of the D/A converter 74 is supplied to a laser diode driving circuit 80 such that a current passing through the laser diode LD is adjusted to an optimum value which has been set by the characteristic data stored in the memory 71. The characteristic data stored in the memory 71 can be rewritten by means of the controller 72 in accordance with the command from the host computer 77. It should be noted that the data for determining the writing laser power can be adjusted by changing a content in address 03H in the memory 71. The manner of rewriting the characteristic data stored in the memory 71 is substantially same as that of the first embodiment, so that it is not explained here.

In the above embodiment, the content of the characteristic data stored in the memory is rewritten by using the host computer. However, according to the invention, the characteristic data can be rewritten by utilizing a personal computer In this case, a program for performing the above explained data changing operation may be available in the form of a floppy disk.

According to the invention, the characteristic data stored in the memory provided in the pick-up unit can be rewritten without removing the pick-up unit from the information recording and/or reproducing apparatus, and therefore even if the characteristics of the record medium are changed, the characteristic data stored in the memory can be rewritten in conformity with the characteristics of the record medium in an easy and prompt manner.

What is claimed is:

1. An apparatus for recording and/or reproducing information on and/or from a record medium, comprising:
   a pick-up unit including (a) a pick-up and (b) a memory means for storing characteristic data which are specific to the relevant pick-up; and
   a main unit including (i) a data reading means for reading the characteristic data out of said memory means to derive a characteristic data signal, (ii) a signal processing means for processing an output signal obtained by reproducing information data, written in said record medium, with said pick-up unit to derive at least one control signal which indicates whether said information data have been correctly recorded, (iii) an adjusting means for adjusting at least one operational condition of the apparatus in accordance with said at least one control signal such that the apparatus can operate in conformity with the characteristics of the relevant pick-up and of the record medium, and (iv) a data rewriting means, responsive to said adjusting means, for selectively rewriting at least some of the characteristic data stored in said memory means to correct the characteristic data to include information for maintaining said adjustment of said at least one operational condition so that the apparatus can continue to operate in conformity with the characteristics of the pick-up and of the record medium.

2. An apparatus according to claim 1, wherein said record medium is an optical record medium and wherein said optical pick-up comprises a housing, a light source provided in said housing for emitting a light beam, an optical system arranged in said housing for projecting the light beam emitted by the light source upon said optical record medium, and a photodetector arranged in said housing for receiving light reflected by the optical record medium, and wherein said memory means is arranged within said housing.

3. An apparatus according to claim 2, wherein the memory means is formed by an electrically erasable and programmable read only memory.

4. An apparatus according to claim 2, wherein said light source is formed by a laser diode and said adjusting means comprises a laser diode driving circuit for producing a driving current whose amplitude is controlled by said control signal.

5. An apparatus according to claim 2, wherein said signal processing means comprises a controller for generating a digital threshold value which is determined by the output signal and said adjusting means comprises a digital/analog converter for converting the digital threshold value into an analog threshold level which is supplied to a comparator for converting a signal read out of the optical record medium into a bivalent signal.

6. A method of resetting operational conditions of an information recording and/or reproducing apparatus including a main unit and a pick-up unit which is detachably secured to the main unit, comprising the steps of:
   (a) storing characteristic data specific to the relevant pick-up unit in a memory means provided in the pick-up unit;
   (b) reading the characteristic data out of said memory means;
   (c) processing the read out characteristic data to derive at least one characteristic data signal;
   (d) controlling at least one operational condition of said information recording and/or reproducing apparatus in accordance with said at least one characteristic data signal such that said apparatus can operate in conformity with the relevant pick-up unit;
   (e) reproducing information data, written in said record medium, by employing said pick-up unit to obtain an output signal which indicates whether said information data have been correctly recorded;
   (f) checking from the output signal whether said at least one operational condition controlled by said characteristic data signal is suitable for said record medium or not; and
   (g) when step (f) determines that the characteristic data signal is not suitable for controlling said at least one operational condition to enable said apparatus to properly record and/or reproduce the information on and/or from the record medium, performing the steps of (i) deriving new characteristic data, (ii) rewriting at least partially the characteristic data and (iii) repeating steps (b)-(f).

7. A method according to claim 6, wherein said information recording and/or reproducing apparatus is connected to a host computer and said checking step, deriving step and rewriting step are controlled by said host computer.

8. A method according to claim 7, wherein said host computer controls said rewriting step by way of vendor unique commands.

* * * * *